(12) United States Patent
Mihara et al.

(10) Patent No.: US 7,356,241 B1
(45) Date of Patent: Apr. 8, 2008

(54) DATA RECORDING AND/OR REPRODUCING APPARATUS

(75) Inventors: Yoshizo Mihara, Kanagawa (JP);
Ichiro Fujisawa, Kanagawa (JP);
Hiroshi Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/437,016

(22) Filed: Nov. 9, 1999

(30) Foreign Application Priority Data

Nov. 10, 1998 (JP) ................................. 10-335000

(51) Int. Cl.
*G11B 27/00* (2006.01)
(52) U.S. Cl. .............................. 386/52; 386/55; 725/91
(58) Field of Classification Search .................. 386/52, 386/55
See application file for complete search history.

(56) References Cited

U.S. PATENT DOCUMENTS

| | | | | |
|---|---|---|---|---|
| 4,272,790 A | * | 6/1981 | Bates ........................... | 386/52 |
| 5,206,929 A | * | 4/1993 | Langford et al. ............. | 386/55 |
| 5,781,435 A | * | 7/1998 | Holroyd et al. ............... | 700/87 |
| 6,144,798 A | * | 11/2000 | Nagasawa et al. ............ | 386/52 |
| 6,591,057 B2 | * | 7/2003 | Nagasawa ..................... | 386/52 |

* cited by examiner

*Primary Examiner*—John Miller
*Assistant Examiner*—James A. Fletcher
(74) *Attorney, Agent, or Firm*—Frommer Lawrence & Haug LLP; William S. Frommer; Thomas F. Presson (57) ABSTRACT

A data recording and/or reproducing apparatus for recording, reproducing or editing of video and audio data includes an input processing unit, having an input processing control portion for controlling data inputting to a recording medium, an output processing control portion for controlling data outputting processing for the recording medium and a main controller for comprehensively controlling the input processing unit and the output processing unit. By the input processing controlling portion and the output processing controlling portion, the input processing unit and the output processing unit can be operated independently of each other. On the other hand, the main controller is able to control the input processing controlling portion and the output processing controlling portion so that these two portions will execute a concerted operation. In this manner, the data recording and/or reproducing apparatus can record and/or reproduce data on or from a non-linear-accessible recording medium while the data recording and/or reproducing apparatus can be built into a routine linear editing system to execute an operation in no way inferior to that of a VTR equipment.

9 Claims, 4 Drawing Sheets

DATA RECORDING AND/OR REPRODUCING APPARATUS

BACKGROUND OF THE INVENTION

1. Field of the Invention

This invention relates to a data recording and/or reproducing apparatus and, more particularly, to a data recording and/or reproducing apparatus used with advantage for recording, reproducing or editing of video and audio data.

2. Description of the Related Art

Recently, with diversification of information furnishing channels, brought about by the coming into widespread use of cable television (CATV), there is raised an increasing demand for recording plural sorts of video and audio data simultaneously from a sole audio video data recording and/or reproducing apparatus or reproducing the data as it records the data. In order to meet this demand, there is coming into widespread use an apparatus termed a video server or an AV (audio and/or video) server, and which records and/or reproduces the image and the speech using a random-accessible recording medium, such as a hard disc.

In general, the video server in a broadcasting station needs to be of high data transfer rate, in view of a demand for high image and speech quality, and of large capacity in order to be able to record data continuing for prolonged time. For satisfying this demand, a data recording and/or reproducing apparatus including plural hard disc (HD) devices capable of storing image and speech data and of parallel processing is used in an attempt to speed up the data transfer rate and to increase the storage capacity as well as to keep parity data recorded in order to assure reliability in case of possible failure of one of the HD devices. By shifting the playback time of the same material data to reproduce the data on multiple channels, it is possible to implement a multi-channel video server capable of accommodating multifarious use configurations, such as by constructing a video-on-demand (VOD) or near-video-on-demand (NVOD).

In the data recording and/or reproducing apparatus, used for such video server, there is employed a technique of Redundant Arrays of Inexpensive Discs (RAID) employing plural HDs as proposed in a treatise in ACM SIGMOND Conference, Chicago, Ill., Jun. 13, 1988, by Patterson et al., entitled "A Case for Redundant Arrays of Inexpensive Discs (RAID)" issued in 1988, in which plural hard disc drives, each made up of plural HDs, are used.

In the above treatise, the RAID is classified into RAID-1 to RAID-5. The RAID-3 splits the input data into pre-set lengths recorded in plural HDDs and generates parity data, which is an EX-OR output of associated data blocks of each HDD, to write the parity data in the other HDD. The RAID-5 is such a system in which the data dividing unit (block) is increased to record the divided block as a data block in a HDD, while the EX-OR output of the associated data blocks of each HDD (parity data) is recorded as a parity block in the other HDD, with the parity block being distributed in other HDDs.

For other RAIDs, reference is had to the above treatise.

Meanwhile, the material actually used in a news program or a sports program is sent out after processing such as editing in the broadcasting station. Since emergency materials need to be transmitted in a news program, and sports programs are occasionally extended in the broadcast time, it is desirable to reduce the editing time.

For carrying out this editing operation, the routine practice is to connect the editing device to the VTR, to decide the material to be transmitted, as the reproduced material on the VTR is checked on an editing device, to record the material on a recording VTR and to transmit the recorded tape from the transmitting VTR.

For shortening the editing time, there is recently used an editing configuration termed a non-linear editing. There is, for example, such a configuration in which the aforementioned AV server is connected to the editing device, the material stored in the AV server is reproduced, the material to be transmitted is decided in the editing device and the material stored in the AV server is transmitted from the editing point information, also termed an editing decision list (EDL). In this case, the time for material search is short, in distinction from the conventional linear editing, such as VTR, such that the material recorded with time lead or time lag can be located or reproduced freely.

However, the editing device needs to be provided in addition to the AV servers even in the non-linear editing configuration, thus taking up the dedicated space. This problem is felt more keenly in case of a relay car having only a limited space. Similarly, a special effect device needs to be mounted if a special effect is to be achieved.

Also, there are not many experienced editors in the non-linear editing. In actual broadcasting stations, linear editing for a tape recording medium is performed in an actual broadcasting station such that many editors are accustomed to this editing configuration.

Moreover, if non-linear editing is to be performed on both the AV server and in the editing device, there are occasions wherein instantaneous cut editing cannot be performed because of the time-divisional control for the storage medium of the AV server, even in case of simple cut editing. That is, the AV server has plural channels, that is plural inputs/outputs, and each channel is adapted to time-divisionally access the HDD in order to make arbitration in using the HDD as the recording medium, or in order to make arbitration in using an internal bus connected to the HDD. By this time-divisional control, there is produced a slight time loss until the material is reproduced responsive to a command from the editing device. This presumably is responsible for the extraneous feeling on the part of the audience to the operation by the editing personnel.

SUMMARY OF THE INVENTION

It is therefore an object of the present invention to eliminate the above-mentioned problems of the prior art and to provide a data recording and/or reproducing apparatus having the functions of data recording and/or reproduction, input/output and editing and which enables the editing operation to be performed on a sole apparatus.

It is another object of the present invention to realize an operation similar to the conventional linear editing.

In one aspect, the present invention provides a data recording and/or reproducing apparatus including recording and/or reproducing means for recording and/or reproducing data inclusive of video data and audio data on a non-linear-accessible recording medium, at least one input processing means for processing and outputting data inputted from outside and for processing and outputting to outside the data outputted from the recording and/or reproducing means and at least one output processing means for processing and outputting the data outputted by the recording and/or reproducing means. The input processing means and the output processing means time-divisionally access the recording and/or reproducing means respectively to input and output data. The apparatus further includes switching means for being fed with the data outputted from the input processing means and the output processing means for selectively outputting the input data to the input processing means and the output processing means and control means for controlling at least one of the input processing means, output processing means and the switching means to perform the processing specified by a control command commanding a pre-set editing mode if the control command is inputted.

In another aspect, the present invention provides a data recording and/or reproducing methods employing a data recording and/or reproducing apparatus including recording and/or reproducing means for recording and/or reproducing data inclusive of video data and audio data on a non-linear-accessible recording medium, at least one input processing means for processing data inputted from outside and for outputting to outside the processed data to the recording and/or reproducing means and at least one output processing means for processing the data reproduced by the recording and/or reproducing means to output the processed data to outside. The input processing means and the output processes means time-divisionally accessing the recording and/or reproducing means respectively to input and output data. The method includes a first step of receiving, as input, a control command specifying a pre-set editing mode, a second step of specifying the input processing means and the output processing means as processing means for executing the control command, a third step of outputting, from the specified output processing means, the data fed to the specified input processing means as input and reproduced from the recording and/or reproducing means from the editing point information up to a first editing point, a fourth step of outputting the data, inputted to the input processing means, to the switching means connected between the input processing means and the output processing means, for a domain from the first editing point to a second editing point, and of outputting the data from the switching means to the specified output processing means, a fifth step of outputting the data outputted at the fourth step to outside and a sixth step of outputting the data reproduced from the recording and/or reproducing means from the second editing step from the output processing means.

In yet another aspect, the present invention provides a data recording and/or reproducing method employing a data recording and/or reproducing apparatus including recording and/or reproducing means for recording and/or reproducing data inclusive of video data and audio data on a non-linear-accessible recording medium, at least one input processing means for processing data inputted from outside and for outputting the processed data to the recording and/or reproducing means and at least one output processing means for processing the data reproduced by the recording and/or reproducing means to output the processed data to outside. The input processing means and the output processing means time-divisionally accessing the recording and/or reproducing means respectively to input and output data. The method includes a first step of receiving, as input, a control command specifying a pre-set editing mode, a second step of specifying the input processing means and the output processing means as processing means for executing the control command, a third step of outputting the data, fed to the specified input processing means and inputted to the input processing means, up to a first editing point from the editing point information, to the switching means connected between the input processing means and the output processing means, outputting the data by the switching means to the specified output processing means and of outputting the data from the output processing means, a fourth step of outputting the data, reproduced from the recording and/or reproducing means, from the first editing point to a second editing point, from the specified output processing means and a fifth step of outputting from the second editing point the data, inputted to the specified input processing means, to the switching means connected between the input processing means and the output processing means, outputting the data by the switching means to the specified output processing means and of outputting the data from the output processing means.

DESCRIPTION OF THE PREFERRED EMBODIMENTS

Referring to the drawings, preferred embodiments of the present invention will be explained in detail.

Figure 1:
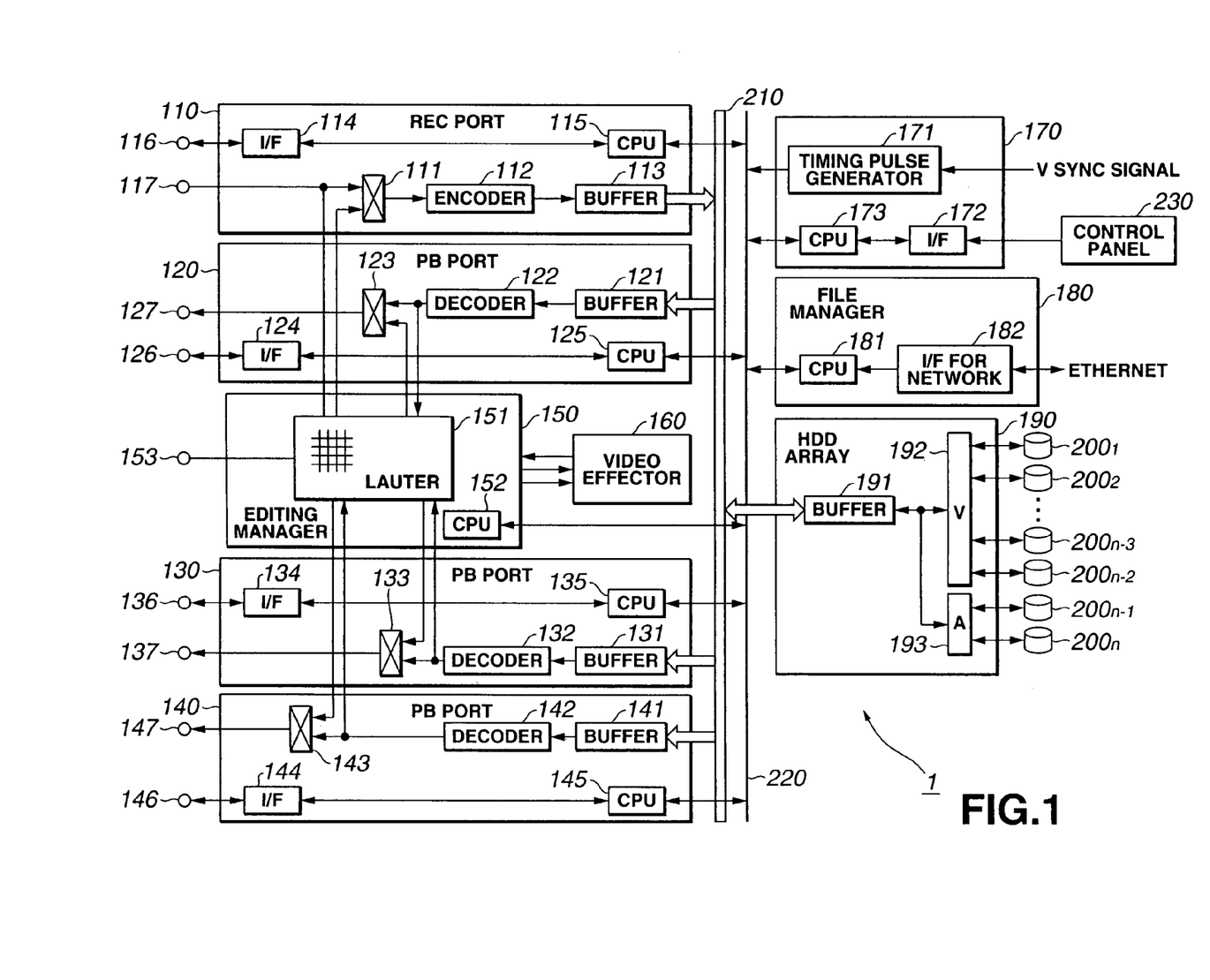
FIG. 1 is a block diagram showing the structure of an A/V server embodying the present invention.

An A/V server 1, shown in FIG. 1, includes a recording port 110, as an input processing unit, reproducing ports 120, 130, 140, an editing manager 150, a video effector 160, a timing manager 180 and a HDD array 190 made up of plural HDDs (hard disc drives)$200_1, \ldots, 200_{n-3}, 200_{n-2}, 200n-1, 200_n$.

The A/V server 1 also includes a data bus 210 for data transfer between the recording port 110 and the ports of the reproducing ports 120, 130, 140 on one hand and the HDD array 190 on the other hand, and a control bus 220 for transferring control signals for controlling various portions.

The recording port 110 is made up of a selector 111, an encoder 112, a buffer 113, an I/F 114, a CPU 115, a remote signal input terminal 116 and an external input terminal 117.

The selector 111 is selection means for selecting data for encoding. Specifically, the selector 111 is connected to the external input terminal 117 and to an output of the editing manager 150, and selects one of the signal from the external input terminal 117 or the signal from a lauter 151 of the editing manager 150 to output the selected signal to a downstream side encoder 112. This selection is under control by a CPU 115.

An input signal from the external input terminal 117 is inputted to both the selector 111 and to the editing manager 150.

The encoder 112 encodes an output signal of the selector 111 in accordance with a pre-set format. Specifically, if the input signal is a SDI (serial digital interface) data, standardized by SMPTE (Society of Motion Picture and Television Engineers)-259M, the encoder 112 decodes this data to encode the data by compression in accordance with MPEG (Moving pictures Experts Group). The data generated by the encoder 112 is inputted to the buffer 113. In the following explanation, it is assumed that the output data is the data encoded by compression by the encoder 112.

The buffer 113 is storage means for transiently storing the compressed data outputted by the encoder 113. The compressed data is transiently stored in the buffer 113 and transmitted to the HDD array 190 over the data bus 210 in accordance with scheduling.

The scheduling means a processing of time-divisional allocating the data bus 210 to the ports 110, 120, 130, 140. Specifically, a timing pulse generator 101 sends timing pulses to CPUs 115, 125, 135, 145 of the ports 110, 120, 130, 140 over a control bus 220. During this timing pulse period (time slot period), each port is allowed to have access to the data bus 210. If a time slot is allocated to the recording port 110, the recording port 110 outputs the data stored in the buffer 113 to the data bus 210. If then a time slot is given to the reproducing port 120, the recording port 110 acquires the data on the data bus 210 on the buffer 121.

An I/F 114 is an interface for remote signals inputted from the remote signal input terminal 116. For example, the remote signal is a command signal for editing processing transmitted from an editing device of an upper system connected to the remote signal input terminal 116.

The CPU 115 is control means for controlling various portions of the recording port 110. For example, the CPU 115 controls various portions of the recording port 110 by e.g., command signals inputted via the I/F 114 or over the control bus 220. Specifically, the CPU 115 actuates various portions based on the command signals for recording processing from the upper system, such as the editing device, inputted from the remote signal input terminal 116.

The CPU 115 also has the function of exchanging command data with the CPUs 125, 135, 145, 152, 181). For example, if a command for playback processing is sent from the editing device, the CPU 115 assumes that the various portions of the recording port 110 operating as the recording port cannot be controlled, and hence transfers the playback processing command to the CPU 152 of the editing manager 150 over the control bus 220.

The CPU 115 controls the portions of the recording port 110 by the command transmitted from the CPU 152 of the editing manager 150. The CPU 115 controls at least the portions of the recording port 110 to initiate the recording processing by the command signal from the CPU 152 of the editing manager 150.

The playback port 120 is made up of a buffer 121, a decoder 122, a selector 123, an I/F 124, a CPU 125, a remote signal input terminal 126 and an external output terminal 127, and performs control to output data read out from the HDDs $200_1, 200_2, \ldots, 200_{n-3}, 200_{n-2}, 200_{n-1}, 200_n$ of the HDD array 190 to outside.

The buffer 121 is storage means for transiently storing data transmitted over the data bus 210 from the HDD array 190.

The decoder 122 decoders the encoded data to convert the data to a format for external outputting, for example, to the aforementioned SDI format, to output the decoded data. Output signals of the decoder 122 are inputted to the selector 123, output signals of which are also inputted to the editing manager 150.

The selector 123 is data selection means for selecting data to be outputted to outside, and is connected to an output of the decoder 122 and to an output of the lauter 151. The selector 123 selects one of the signals from the decoder 122 or the lauter 151, under control by the CPU 125, to output the selected signal to the external output terminal 127.

The I/F 124 is an interface for remote signals inputted from the remote signal input terminal 126. For example, the remote signals are command signals transmitted from an editing device.

The CPU 125 is control means for controlling various portions of the reproducing port 120. The CPU 125 controls the portions of the respective portions of the reproducing port 120 by e.g., command signals inputted from, for example, the I/F 124 or over the control bus 220. Specifically, the CPU 125 controls the selection of the output data of the data selection means or actuates the various portions under the command signal for playback processing from e.g., the editing device inputted from the remote signal input terminal 126.

This CPU 125 also has the function of exchanging commands with the other CPUs 115, 135, 145, 152, 173, 181. For example, the CPU 125 has the function of transferring a command transmitted from the editing device, and which it itself cannot process, such as a command specifying the recording processing, to the CPU 152 of the editing manager 150 over the control bus 220.

The CPU 125 can be controlled by the CPU 152 of the editing manager 150. For example, the CPU 115 controlling the portions of the reproducing port 120 to start the reproducing processing on reception of a command signal from the CPU 152 of the editing manager 150.

The reproducing ports 130, 140 are configured similarly to the above-described reproducing port 120.

Specifically, the reproducing port 130 includes a buffer 131, for transiently storing data from the HDD array 190, a decoder 132 for decoding encoded data inputted from the buffer 131 and for converting the format to an external format to output the converted data, a selector 133 for selecting one of the signal from the decoder 132 and the signal from the lauter 151 to output the selected signal to the external output terminal 137, an I/F 134 operating as an interface for remote signals inputted from a remote signal input terminal 136 and a CPU 135 for controlling the various portions of the reproducing port 130 by, for example, command signals.

The reproducing port 140 includes a buffer 141, for transiently storing data from the HDD array 190, a decoder 142 for decoding encoded data inputted from the buffer 141 and for converting the format to an external format to output the converted data, a selector 143 for selecting one of the signal from the decoder 142 and the signal from the lauter 151 to output the selected signal to the external output terminal 147, an I/F 144 operating as an interface for remote signals inputted from a remote signal input terminal 146 and a CPU 145 for controlling the various portions of the reproducing port 140 by, for example, command signals.

Similarly to the reproducing port 120, the reproducing ports 130, 140 output the decoded signals to the editing manager 150.

Similarly to the CPU 125 of the reproducing port 120, the CPUs 135, 145 of the reproducing ports 130, 140 can communicate with the other CPUs, and can be controlled by the CPU 152 of the editing manager 150.

The editing manager 150 is configured as a portion responsible for signal processing, such as editing, of data in the reproducing ports 120, 130, 140.

The editing manager 150 has a CPU 152 for controlling the various portions of the layer 151 and the editing manager 150.

The lauter 151 has the function of a matrix switcher and an audio mixer and is connected to the reproducing ports 110, 120, 130, 140 and to the video effector 160. That is, the lauter 151 is fed with data inputted from outside via a terminal 117 and with reproduced data inputted from the decoders of the reproducing ports 120, 130, 140 to perform editing, such as cut editing. If the edited data is to be outputted to outside, it is again outputted to selectors 123, 133, 143 of the reproducing ports 120, 130, 140 and, if the edited data is to be re-recorded on the HDD array 190, it is outputted to the selector 111 of the recording port 110. If the input data is to be processed with special effect, it is outputted to the downstream side video effector 160. The video effector 160 has two output paths and an input path, as shown in FIG. 1. The reason of providing the two output paths is that special effect processing is to be performed on two different data.

The CPU 152 is control means for controlling various portions of the editing manager 150.

The CPU 152 also has the function of main control means for controlling the CPUs 115, 125, 135, 145 of the ports 110, 120, 130, 140. By the CPU 152 being able to control the CPUs 115, 125, 135, 145 of the ports 110, 120, 130, 140, it becomes possible to control plural ports 110, 120, 130, 140 simultaneously to perform editing by concerted operation. The CPU 152 has the function not only of providing concerted operation of the ports 110, 120, 130, 140 but also of controlling the various portions of the editing manager 150.

Specifically, the CPU 152 causes concerted operation of the ports 110, 120, 130, 140 and the other ports 110, 120, 130, 140 and activate the editing function by the respective parts of the editing manager 150, based on the command transmitted from the ports 110, 120, 130, 140 as not being processable ports, while actuating the editing function by the respective parts of the editing manager 150. If, for example, the editing command is transmitted by the editing device to ports 110, 120, 130, 140, the editing command is transferred from the ports 110, 120, 130, 140 to the CPU 152 of the editing manager 150. The CPU 152 causes concerted operation of the respective parts of the ports 110, 120, 130, 140 and the editing manager 150 based on the transferred commands to set the editing mode.

The video effector is a portion responsible for performing an effect operation on output data of the lauter 151. Specifically, the video effector 160 performs special effect processing, such as keying, transition, picture-in-picture (PinP), wiping or translation, on the input image data.

The timing manager 170 is responsible for generating timing pulses based on video synchronization signals for doing the above-mentioned scheduling of the data bus 210. This timing manager 170 includes a timing pulse generator 170, and an I/F 172, as an interface between the timing pulse generator 170 and a control panel 230.

The control panel 230 is a user interface (UI) acted on by the user to generate corresponding control signals.

Specifically, the control panel 230 is made up of plural actuating buttons and, responsive to the actuation of the respective actuating buttons, selects the recording port 110, reproducing ports 120, 130, 140 or the VTR connected as an external equipment to output control signals to the selected port or VTR. The control signals are inputted over the control bus 220 to the CPU of each port. Based on the control signals, such as, for example, recording, reproducing or editing signals, the respective ports or the VTR equipment control the various portions.

The file manager 180 is data supervising means provided with the CPU 181 and with an I/F for network 182.

The I/F for network 182 is an interface with respect to the external network. For example, the I/F for network 182 is connected on the Ethernet.

The CPU 181 supervises data based on input signals from the I/F for network 182. That is, the file manager 180 controls the various portions based on the control signals transmitted from the network.

The file manager 180 then supervises the files attached to the HDD 200, to 200$_n$. Specifically, the file manager 180 holds the information as to in which address of the HDDs 200$_1$ to 200$_n$ each file has been stored. For example, the file manager 180 holds, on the file basis, the information as to the leading addresses of the HDDs 2001 to 200*n* and the address length from the leading address.

The HDD array 190 is data storage means for storing the various data.

This HDD array 190 includes a buffer 191, plural HDDs 200, 200$_2$, . . . , 200$_{n-3}$, 200$_{n-2}$, 200$_{n-2}$, 200$_{n-1}$, 200$_n$, image data write/readout processing unit 192, and speech data write/readout unit 193.

The buffer 191 transiently stores data when transferring data between it and the data bus 220.

The image data write/readout processing unit 192 writes and read out data in or from the HDDs 200$_1$, 200$_2$, . . . , 200$_{n-3}$, 200$_{n-2}$, 200$_{n-2}$, 200$_{n-1}$, 200$_n$.

The speech data write/readout unit 193 writes or reads out speech data for the HDDs 200$_{n-2}$ and 200$_n$.

In the preferred embodiment, the plural HDDs 200$_1$ to 200$_{n-2}$ are so-called RAID-3 data, whilst the HDDs 200$_{n-1}$, 200$_n$, in which audio data are recorded, adopt the so-called RAID-1 configuration to elevate reliability of each data.

The above is the manner in which the portions of the A/V server 1 are constructed. The recording port 110 operates as a sole channel input unit, while the ports 120, 130, 140 operate as three-channel output units. In the A/V server 1, the ports 110, 120, 130, 140 operate within allocated timer slots.

That is, if, the recording port 110 is selected, the A/V server 1 operates as a recording device for recording image data on the HDD array 190 by the recording port 110. If one of the recording ports 120, 130, 140 is selected, the AN server 1 operates as a reproducing device for reproducing the image data for the HDD array 190 by the selected reproducing port. If each port of the recording and/or reproducing apparatus 1 is designed to process a sole channel, concurrent inputting/outputting via plural channels is achieved.

In editing, the recording port 110 and one of the reproducing ports 120, 130, 140 are operated in concert to provide an operation in an editing mode. For example, if the A/V server I is connected to an existing linear editing system or a live relaying system, the A/V server 1 operates in a so-called linear editing mode in which the recording and reproducing ports are operated in concert as a virtual VTR.

The A/V server 1 is able to select the non-linear editing mode or the linear editing mode. For example, this mode switching is done by a command transmitted from the editing device as an upper system. That is, if a command for recording processing is transmitted from the editing device to the recording port 110, the A/V server 1 initiates its recording processing in the non-linear editing mode, whereas, if an editing command, such as cut editing command, is transmitted, the A/V server 1 sets the linear editing mode to initiate the processing by the recording and reproducing ports.

The reason for the concerted operation of the recording and reproducing ports in the A/V server 1 as a combination, that is the so-called bound operation, is as follows:

The binding is a state in which a recording port and a reproducing port are selected as a set. The reason this state is used is that if, in a device type in which the reproducing port and the recording port can be selected and actuated completely independently in a routine operation, only the recording port is selected, the recorded audio and video signals cannot be monitored simultaneously. That is, if the recording port is selected, concurrent monitoring is possible by this binding if a sole reproducing port is acquired. If playback is to be performed immediately following the recording, it is convenient if there is a state of simultaneous selection of the recording and reproducing ports since then the necessity of selecting the ports every recording or reproducing operation.

If a port cannot be operated except independently of the operation of the remaining ports, it becomes necessary to provide a controller for simultaneously controlling the recording and reproducing ports. Thus, a linear editing device, constructed on the premises that a pre-existing VTR equipment is used, cannot directly be used. However, by binding, it becomes possible with the linear editing system to operate the A/V server 1 in the same way as the VTR equipment. In the absence of this binding state, it is necessary to create a pre-view image virtually by an external switcher if an output during pre-view or editing is to be viewed, thus increasing the number of the equipments and complicating the control software.

That is, the A/V server 1 can be operated in the similar manner to the conventional VTR equipment during editing, by combining the recording and reproduced ports, which inherently should operate independently of each other. Moreover, the A/V server 1 can be built into the conventional linear editing system.

First, a command, as later explained, is inputted from an editing device, connected to the recording port 110 of the data recording and/or reproducing apparatus 1, via a terminal 116 and an I/F 114, to the CPU 115.

In the CPU 115, the information (table) as to whether or not the respective portions of the recording port 110 are to be controlled by the sorts of the input command or outputted over the control bus 220 to the CPU 152 of the editing manager 150, is stored in a memory, such as ROM, not shown. For example, if a control command for commanding reproduction is inputted to the recording port 110, this control command is outputted over the control bus 220 to the CPU 152 of the editing manager 150.

If the control command instructing the automatic editing mode for the pre-set ports 110, 120 is inputted, it is similarly outputted to the CPU 152, under control by the CPU 115 in accordance with the table stored in the memory, not shown, of the recording port 110.

On reception of the command instructing the automatic editing mode, the CPU 152 issues the control command to the port to be operated in concert in accordance with the table stored in the memory, not shown, of the editing manager 150. In the preferred embodiment, the control command is issued via the control bus 220 to the CPUs 115, 125 of the recording port 110 and the reproducing port 120. The sequence of control commands, shown in FIG. 4, as later explained, is executed by a sequential command stored in the ROM, not shown. The sequence of control commands begins with the reception of Auto Edit (4-5), that is a control command instructing automatic editing, until outputting of a STOP command (4-12). This sequence of control commands includes a control command to the lauter 151.

Figure 4:
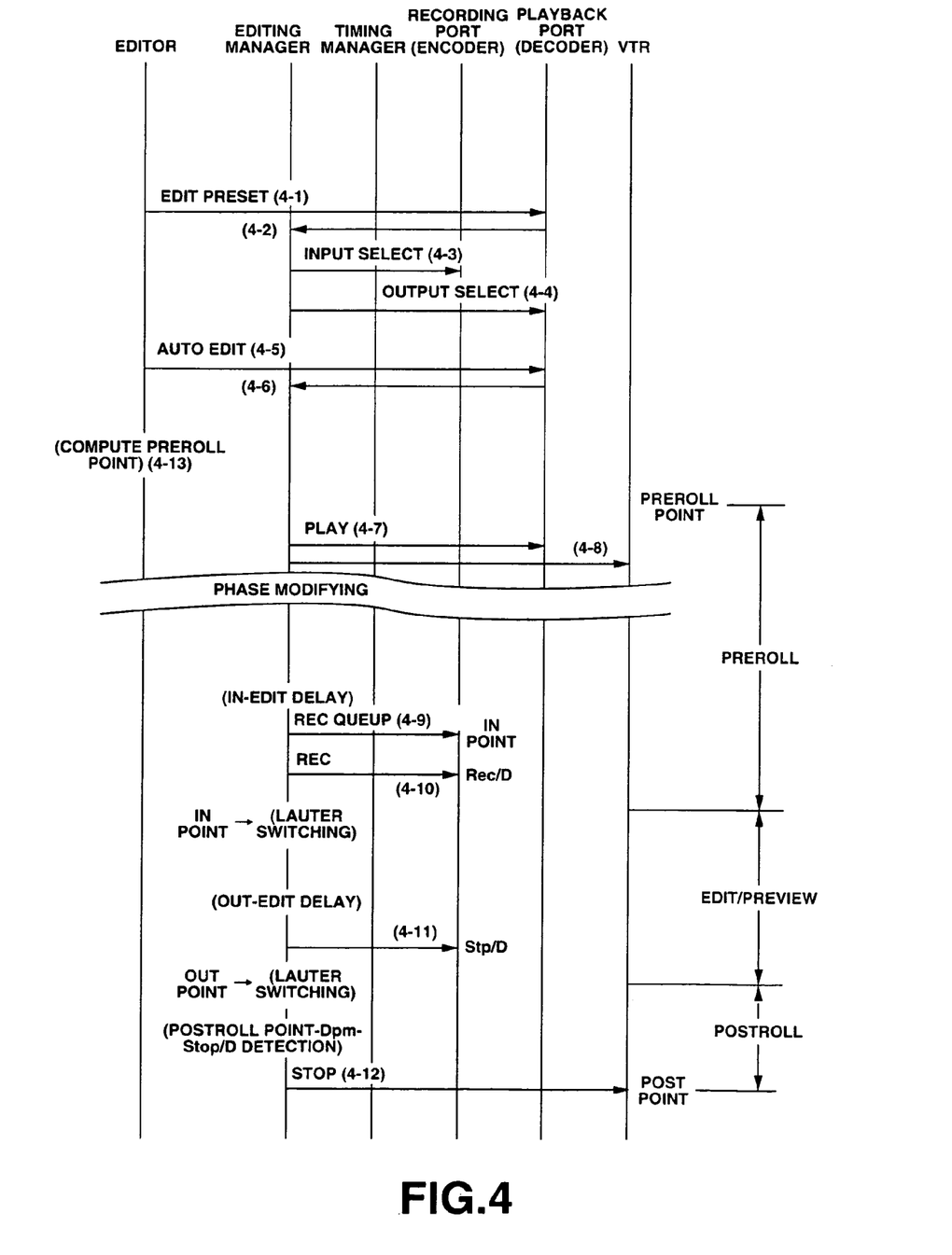
FIG. 4 shows a command flow for an A/V server built into a linear editing system.

By the sequence of control commands for the recording port 110 and reproducing port 120, issued by the CPU 152 of the editing manager 150, the concerted port operation is executed so that the data recording and/or reproducing apparatus 1 is connected to the external VTR. This the data recording and/or reproducing apparatus 1, that is the recording port and the reproducing port, operates as virtual VTR.

Meanwhile, in exchanging commands between the CPUs in the equipments of the A/V server 1, it is necessary that the delay since command generation until execution on the reception side be fixed, as in the editing device. In the conventional linear editing system, the editing device transmits the command to the reception side so that the command will be terminated to terminate the processing in a frame of the reproducing image. In this consideration, the command exchange between the CPUs in the A/V server 1 is also performed so that the processing will be completed within the frame of the reproduced image.

Figure 2:
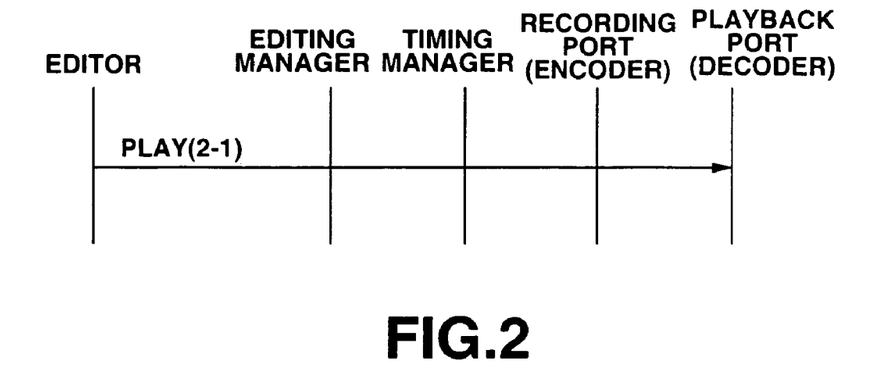
FIG. 2 shows a command flow for reproduction in the A/V server.
Figure 3:
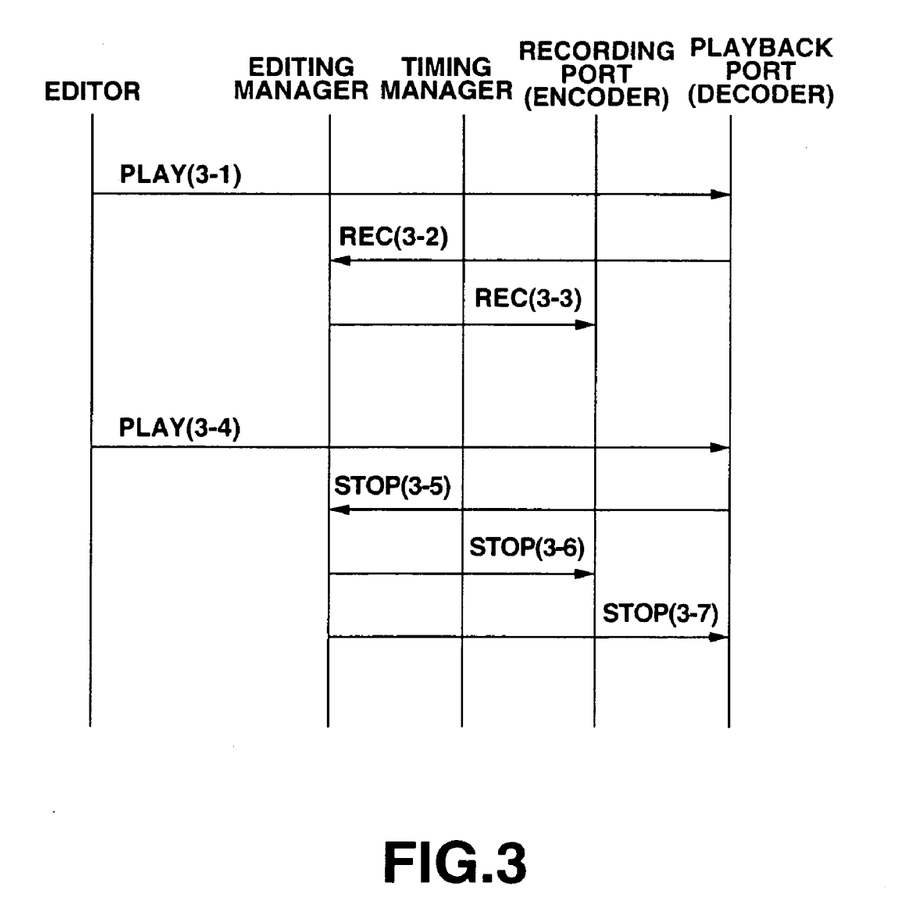
FIG. 3 shows a command flow for recording in the A/V server.

Referring to FIGS. 2 to 4, the manner in which the reproducing, recording and editing operations are executed based on commands received by the A/V server 1 from the reproducing port is explained.

FIG. 2 shows a command flow in the reproducing processing in the A/V server 1 and FIG. 3 shows a command flow in the recording processing in the A/V server 1, whilst FIG. 4 shows a command flow in the editing processing exploiting the A/V server 1 and the conventional VTR equipment.

For reproducing processing, the reproducing port starts a decoder by a PLAY command (2-1) from the editing device. That is, the PLAY command from the editing device is inputted via input terminals 126, 136, b146 to the reproducing ports 120, 130, 140 and inputted via the I/Fs 124, 134, 144 to the CPUs 125, 135, 145, respectively. The reproducing ports recognize the PLAY command from the editing device as a command which it can process itself, and initiates the reproducing processing as it controls the ports 120, 130, 140 based on the commands. If the PLAY command from the editing device is inputted to the input terminal 116 of the recording port 110, the CPU 115 transfers the command over the control bus 220 to the CPU 152 of the editing manager 150 as a command that can be processed.

In the recording processing, a REC command C-1 from the editing device is inputted to the CPUs 125, 135, 145 of the reproducing ports 120, 130, 140 via input terminals 126, 136, 146 and I/Fs 124, 134, 144, respectively. This REC command is transferred via the control bus 220 to the editing manager 150.

The CPU 152 of the editing manager 150 decides that this REC command is the command for the recording port and transfers this REC command to the recording port 110. The CPU 115 of the recording port 110 initiates the recording processing as it controls the encoder by this transferred REC command.

A STOP command (3-4), outputted by the editing device on termination of the recording, is inputted to the CPUs 125, 135, 145 of the reproducing ports 120, 130, 140 by the same route as that for the PLAY command. If the STOP command, instructing the end of the recording, is inputted to the CPUs 125, 135, 145 of the ports 120, 130, 140 operating as the reproducing ports, this STOP command is a command that cannot be processed, and hence is transferred over the control bus 220 to the editing manager 150.

The CPU 152 of the editing manager 150 decides that this STOP command is the command for the recording port and transfers it to the recording port 110 (3-6). The CPU 115 of the recording port 110 terminates the recording processing of the respective portions of the recording port 110 by this transferred STOP command.

During this recording processing, the reproducing ports 120, 130, 140 cannot verify whether or not the STOP command received from the editing device is a command for terminating the processing for the reproducing ports 120, 130, 140 or a command for terminating the processing by the recording port 110. In the concerted operation, the reproducing ports 120, 130, 140 send the STOP command to the editing manager 150 unconditionally. The CPU 152 of the editing manager 150 generates a new command, based on the STOP command sent from the recording port, to transmit the command to the recording port and to the reproducing port.

Thus, the A/V server 1 selects the ports by PLAY command and the REC command, outputted by the editing device, to cause the ports to execute the processing independently.

In the editing processing, the ports and the VTR are actuated by the sequence of operations shown in FIG. 4. The explanation is made on the following premises:

In the linear editing system, the A/V server 1 is the recording side and the VTR is the reproducing side for reproducing the audio and video signals recorded on the tape.

On the other hand, the IN and OUT points of an image from the reproducing side VTR are pre-set on the A/V server 1.

Under these conditions, the editing processing for cut editing is realized by the following sequence:

First, the EDIT PRESET command as a command for preparation of the editing operation is inputted to one of the reproducing ports 120, 130, 140 of the A/V server 1. In the reproducing ports 120, 130, 140, the CPU transfers the command to the editing manager 150 over the control bus 220.

The editing manager 150 generates an INPUT SELECT command and an OUTPUT PRESET command, by the transferred EDIT PRESET command, to output the generated commands at a recording port and a reproducing port (4-3, 4-4). That is, INPUT SELECT and OUTPUT SELECT commands are issued at the recording port 110 and the reproducing port 120, respectively. The CPU 152 of the editing manager 150 issues these commands in accordance with the table recorded in a memory, not shown, at the pre-set ports.

The recording port knows by the INPUT SELECT command that it has been selected as a port for recording processing for editing, whilst the reproducing port knows by the OUTPUT PRESET command that it has been selected as a port for reproducing processing for monitoring the recording in editing.

From the editing device, an AUDIT EDIT command, as a command for causing the data recording and/or reproducing apparatus 1 to operate as an automatic editing device is inputted to the reproducing ports 120, 130, 140 (4-5). The reproducing ports 120, 130, 140 transfer the AUDIT EDIT command to the editing manager 150 (4-6). This starts the following automatic editing function by the CPU 152 of the editing manager 150. The following control commands are issued by the CPU 152 to the CPUs of the ports. That is, the following commands are issued sequentially in accordance with the sequence of command tables stated in the memories, such as ROM, not shown.

The CPU 152 of the editing manager 150 issues the PLAY command and outputs the command to the reproducing port 120.

The reproducing port 120 and the VTR outputs an image as the PREROLL domain is modified in phase up to the editing point. The editing manager 150 outputs the playback image on a monitor by a reproducing port as a PREVIEW image of the PREROLL domain.

The CPU 152 of the editing manager 150 transmits REC QUEUP command initiating the recording from the IN point to the CPU 125 of the recording port 110. At this time, the editing manager 150 transmits the command, taking into account the delay up to the start of recording processing by the recording port 110, in order to start the editing at the IN-point. The recording port 110 effects cue-up to the point IN by this REC QUEUP command.

The CPU 152 of the editing manager 150 then transmits the REC command to the CPU 115 of the recording port 110. The recording port 110 starts the recording from the IN point by this REC command. The recording by this REC command at the recording port 110 is started correctly from the IN point because the command is sent from the CPU 152 of the editing manager 150 taking into account the delay (REC/D) up to the actual processing.

The editing manager 150 switches the lauter 151 at this IN point to output the reproducing image from the VTR as a preview image in the EDIT/PREVIEW domain on the monitor. That is, data inputted via terminal 117 to the recording port 110 is inputted to the lauter 151, an output of which is outputted by the selector 123 under control by the CPU 125.

The editing manager 150 transmits the REC STOP command to the CPU 115 of the recording port 110 to terminate the recording at the OUT point as the editing end point. The editing manager 150 transmits the command, taking into account the delay up to the end of the recording processing by the recording port to start the editing at the OUT point.

In the recording port 110, the recording processing is terminated at the OUT point by the REC STOP command. The recording end at the OUT point by this REC STOP command is transmitted taking into account the delay (STP/D) until actual processing from the editing manager 150 and hence is accurate.

The editing manager 150 switches the lauter 151 at this OUT point to re-start the outputting of the playback image by the reproducing port 120 as the PREVIEW image of the POST ROLL domain. The preview image of the POST ROLL domain is outputted by switching the image inputted at the recording port 110 to output the output image from the lauter 151 by selection by the selector 123.

The editing manager 150 transmits the STOP command to the VTR.

The VTR halts the image reproduction at the POST point by this STOP point. The image reproducing processing is terminated at the OUT point in the reproducing port 120.

The editing processing by the pre-existing linear editing system, incorporated into the A/V server 1, is realized as described above.

Figure 5:
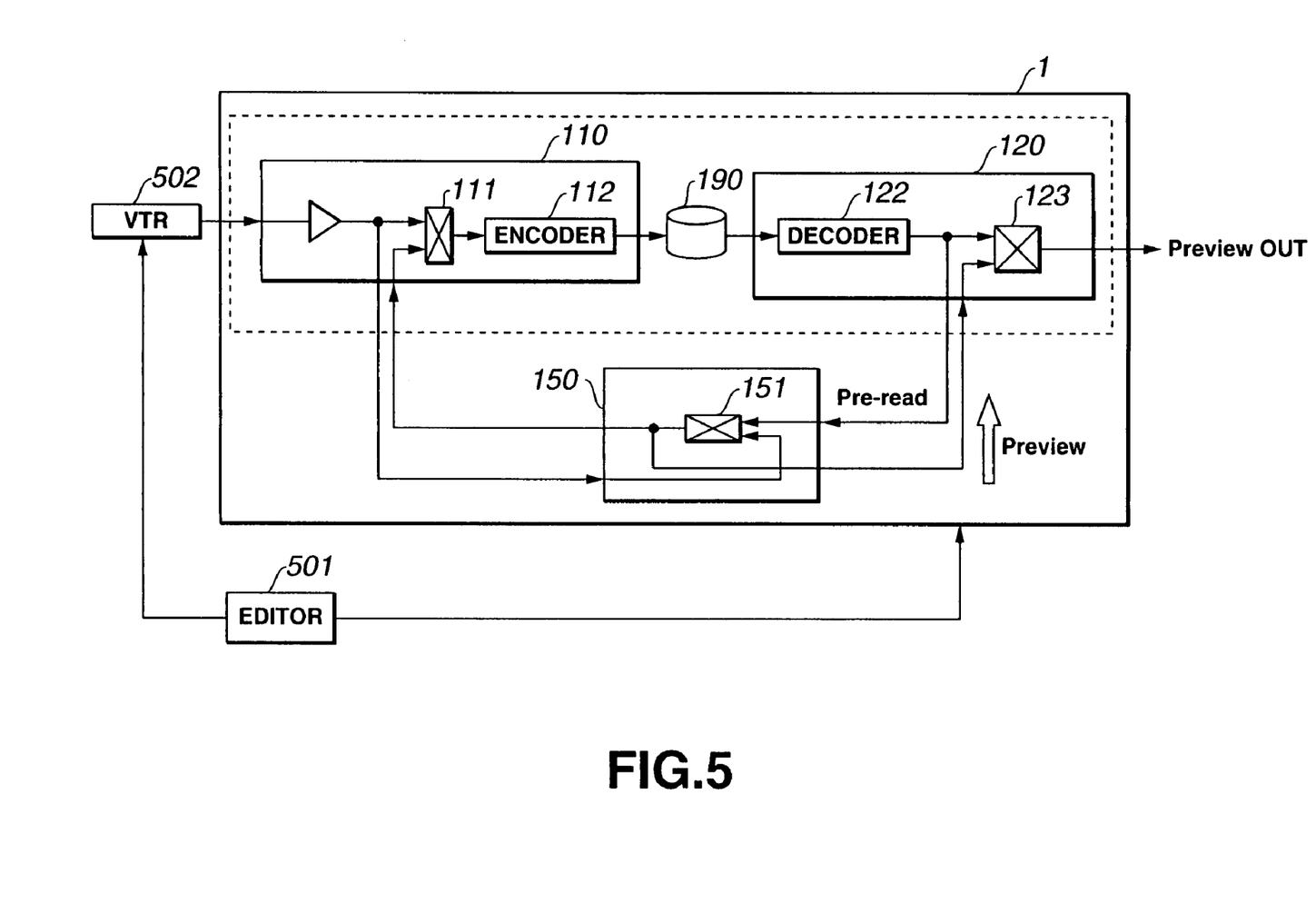
FIG. 5 shows the structure of an A/V server as a virtual VTR in the linear editing system.

FIG. 5 shows the linear editing system constituted by the A/V server 1 realizing the above-described processing.

For cut editing, an image starts to be reproduced from the PREROLL point by the A/V server 1 as described above. That is, the image of the PREROLL domain is outputted via the recording port 110, lauter 151 and the selector 123 of the reproducing port. The image of the editing domain is outputted via the reproducing port of the array 19. In editing an image outputted from the VTR in the IN-OUT domain, the image reproduced from the HDD 190 is previewed via the reproducing port 120 for the PREROLL domain, while the image inputted to the recording port 110 during the IN-OUT domain is outputted via the lauter 151 and the reproducing port 120. During the POST-ROLL domain, the image reproduced from the HDD 190 is outputted via the reproducing port 120.

The image inputted from the VTR is inputted to the recording port 110 so as to be recorded on the HDD array 190 via the selector 111 and the encoder 112.

The image inputted from the VTR is inputted to the recording port 110 so as to be recorded via the selector 111 and the encoder 112 on the HDD array 190.

The A/V server 1 is capable of performing the operation similar to that of the conventional VTR, such that the linear editing device is able to permit the A/V server 1 to operate in a manner not inferior in any way to a routine VTR.

The A/V server 1 permits each port to operate independently so that the A/V server 1 can operate as a non-linear editing system for recording and/or reproducing data for a non-linear accessible recording medium.

Also, by concerted operation of the ports, which should inherently operate in an independent fashion, the A/V server 1, as a linear editing device, can perform cut editing.

Moreover, the A/V server 1 can replace the routine VTR equipment, so that an editing system can be constructed easily without re-designing the linear editing system nor changes in the peripherals. This allows the pre-existing linear editing system to permit editing on the user interface such as to exploit the superior response properties of the non-linear equipment.

Since the A/V server 1 can be applied to the linear editing system by the CPU 152 of the editing manager 150 controlling the respective ports based on the command from the editing device, the linear editing system can be constructed without using a new upper controller for controlling the A/V server 1.

That is, similarly to the conventional VTR equipment, the A/V server 1 can be controlled in the linear editing system by a sole cable.

By optimizing the operating mode conforming to the using style, the A/V server 1 can be applied not only to the non-linear editing system but also to a variety of applications.

The A/V server 1 permits the mixed linear/non-linear editing. That is, by providing linear editable ports and non-linear editing ports in co-existence in the same device, optimum editing techniques can be selected for materials or programs.

What is claimed is:

1. An A/V server comprising:
    a recording means and a plurality of reproducing means for recording and reproducing data inclusive of video data and audio data on a non-linear-accessible recording medium;
    at least one input processing means having a first processing means for receiving a number of commands, for processing and outputting data inputted from outside and for processing and outputting to outside the data outputted from said recording or reproducing means;
    at least one output processing means having a second processing means for processing and outputting the data outputted by said recording or reproducing means; and
    time-divisional controlling means for controlling said input processing means and the output processing means to time-divisionally access said recording or reproducing means respectively to input and output data;
    the apparatus further comprising:
    switching means having a third processing means for being fed with said data outputted from said input processing means and the output processing means for selectively outputting the input data to said input processing means and the output processing means;
    editing mode selecting means for selecting a linear or non-linear editing mode; wherein said recording and reproducing means operate in a bound state such the recording means and one of the plurality of reproducing means are selected as a set and work in concert with one another during editing;
    control means for controlling at least one of said input processing means, output processing means and the switching means to perform the processing specified by a control command commanding an editing mode; and
    selecting means for receiving said number of commands from said at least one input processing means and for interpreting said number of commands,
    wherein said third processing means controls said first processing means and said second processing means,
    wherein said selecting means controls said at least one input processing means, said at least one output processing means, and said recording or reproducing means based on said number of commands interpreted by said selecting means,
    wherein a recording port and a reproducing port are selected as a set such that the recorded audio and video signals are monitored simultaneously.

2. The A/V server of claim 1 wherein
    said input processing means and the output processing means each having first and second selection means;
    said first selection means being fed as inputs with said data inputted from outside and said data outputted from said switching means so that one of these data is outputted from said control means;
    said second selection means being fed with said data reproduced from the recording or reproducing means and said data outputted from said switching means so that one of said data is outputted under control by said control means.

3. The A/V server of claim 2 further comprising:
    external reproducing means;
    said control means performing control so that, when a control command specifying said pre-set editing mode is inputted, the data reproduced from the external reproducing means is inputted to said input processing means and outputted to said switching means, while the data inputted to said switching means is outputted to said output processing means.

4. The A/V server according to claim 3 wherein said control means controls said input processing means so that said data outputted by said switching means will be selectively outputted by said first selection means so as to be re-recorded by said recording means.

5. The A/V server according to claim 3 wherein said control means controls said output processing means so that, when the data outputted by said switching means is outputted to outside, the data is selectively outputted from said second selection means.

6. The A/V server according to claim 2 further comprising:
    external reproducing means;
    said control means on reception of a control command specifying said pre-set editing mode controlling said output processing means so that the data recorded on the recording medium will be outputted from said output processing means, said control means also controlling the input processing means, output processing means and the switching means so that the reproduced data reproduced from a pre-set first editing point will be inputted from the input processing means to said switching means and further outputted from said switching means to said output processing means and from said second selection means, the data recorded on the recording medium being outputted from a pre-set second editing point from the output processing means.

7. The A/V server according to claim 2 further comprising:

external reproducing means;

said control means on reception of a control command specifying said pre-set editing mode controlling said input processing means, output processing means and the switching means so that the data reproduced from the external reproducing means will be inputted from said input processing means to said switching means and further outputted from said switching means to said output processing means and from said second selection means, said control means also controlling said output processing means so that the data recorded on said recording and/or reproducing means will be outputted from the pre-set first editing point from said output processing means, said control means also controlling said input processing means, output processing means and said switching means so that the data reproduced from the external reproducing means from a pre-set second editing point will be inputted to said switching means and so that the data will be outputted from said switching means to said output processing means so as to be outputted from said second selection means.

8. A data recording and/or reproducing method for recording and/or reproducing data using a data recording and/or reproducing apparatus comprising:

a recording means and a plurality of reproducing means for recording and reproducing data inclusive of video data and audio data on a non-linear-accessible recording medium;

at least one input processing means having a first processing means for receiving a number of commands, for processing data inputted from outside and for outputting to outside the processed data to said recording and/or reproducing means;

at least one output processing means having a second processing means for processing the data reproduced by said recording and/or reproducing means to output the processed data to outside;

time-divisional controlling means for controlling said input processing means and the output processing means to time-divisionally access said recording and/or reproducing means respectively to input and output data;

selecting means for receiving said number of commands from said at least one input processing means and for interpreting said number of commands, wherein said selecting means controls said at least one input processing means, said at least one output processing means, and said recording and/or reproducing means based on said number of commands interpreted by said selecting means; and editing mode selecting means for selecting a linear or non-linear editing mode; wherein said recording and reproducing means operate in a bound state such that the recording means and one of the plurality of reproducing means are selected as a set and work in concert with one another during editing;

said method comprising:

a first step of receiving, as input, a control command specifying an editing mode;

a second step of specifying said input processing means and the output processing means as processing means for executing said control command;

a third step of outputting, from the specified output processing means, said data fed to said specified input processing means as input and reproduced from said recording and/or reproducing means from the editing point information up to a first editing point;

a fourth step of outputting said data, inputted to said input processing means, to switching means connected between said input processing means and the output processing means, for a domain from said first editing point to a second editing point, and of outputting said data from said switching means to said specified output processing means;

a fifth step of outputting the data outputted at said fourth step to outside; and a sixth step of outputting said data reproduced from said recording and/or reproducing means from said second editing step from said output processing means, wherein concerted operation of respective parts of said at least one input processing means, said at least one output processing means, and said switching means is caused on the basis of said control command, wherein a recording port and a reproducing port are selected as a set such that the recorded audio and video signals are monitored simultaneously.

9. A data recording and/or reproducing method for recording and/or reproducing data using a data recording and/or reproducing apparatus comprising:

a recording means and a plurality of reproducing means for recording and reproducing data inclusive of video data and audio data on a non-linear-accessible recording medium;

at least one input processing means having a first processing means for receiving a number of commands, for processing data inputted from outside and for outputting the processed data to said recording and/or reproducing means;

at least one output processing means having a second processing means for processing the data reproduced by said recording and/or reproducing means to output the processed data to outside;

time-divisional controlling means for controlling said input processing means and the output processing means to time-divisionally access said recording and/or reproducing means respectively to input and output data;

selecting means for receiving said number of commands from said at least one input processing means and for interpreting said number of commands, wherein said selecting means controls said at least one input processing means, said at least one output processing means, and said recording and/or reproducing means based on said number of commands interpreted by said selecting means; and editing mode selecting means for selecting a linear or non-linear editing mode;

wherein said recording and reproducing means operate in a bound state such that the recording means and one of the plurality of reproducing means are selected as a set and work in concert with one another during editing;

said method comprising:

a first step of receiving, as input, a control command specifying an editing mode;

a second step of specifying said input processing means and the output processing means as processing means for executing said control command;

a third step of outputting said data, fed to said specified input processing means and inputted to said input processing means, up to a first editing point from the editing point information, to said switching means connected between the input processing means and the output processing means, outputting the data by said switching means to said specified output processing means and of outputting the data from said output processing means;

a fourth step of outputting said data, reproduced from said recording and/or reproducing means, from said first editing point to a second editing point, from the specified output processing means; and a fifth step of outputting from said second editing point said data, inputted to said specified input processing means, to switching means connected between the input processing means and the output processing means, outputting the data by said switching means to said specified output processing means and of outputting the data from said output processing means, wherein concerted operation of respective parts of said at least one input processing means, said at least one output processing means, and said switching means is caused on the basis of said control command.

wherein a recording port and a reproducing port are selected as a set such that the recorded audio and video signals are monitored simultaneously.

* * * * *